United States Patent [19]

Otani et al.

[11] Patent Number: 4,533,027

[45] Date of Patent: Aug. 6, 1985

[54] FRICTION BRAKE ASSEMBLY

[75] Inventors: Toshiaki Otani; Takeshi Chihara; Tsutomu Nishikori, all of Hiroshima, Japan

[73] Assignees: Mazda Motor Corporation; Delta Kogyo Co., Ltd., both of Hiroshima, Japan

[21] Appl. No.: 518,012

[22] Filed: Jul. 28, 1983

[30] Foreign Application Priority Data

Aug. 9, 1982 [JP] Japan ................................ 57-138827
Aug. 9, 1982 [JP] Japan ............................ 57-121184[U]

[51] Int. Cl.³ ........................ F16D 67/02; B60T 13/04
[52] U.S. Cl. ................................ 192/8 C; 192/12 BA; 188/77 W; 188/166; 248/394; 297/328; 297/374
[58] Field of Search ............... 188/77 W, 78, 110, 336, 188/339, 166; 192/8 C, 17 D, 12 BA, 33 C, 41 A, 45.1; 74/531, 533; 297/374, 328; 248/394, 395

[56] References Cited

U.S. PATENT DOCUMENTS

| 2,706,413 | 4/1955 | Mendenhall | 192/41 A X |
| 3,219,163 | 11/1965 | Zlotek | 192/45.1 |
| 4,114,739 | 9/1978 | Colonna et al. | 192/45.1 X |
| 4,191,060 | 3/1980 | Sessa | 192/8 C X |
| 4,371,065 | 2/1983 | Engels et al. | 192/8 C |
| 4,388,988 | 6/1983 | MacDonald | 192/12 BA |

FOREIGN PATENT DOCUMENTS 56-124522  9/1981  Japan .

Primary Examiner—George E. A. Halvosa
Assistant Examiner—Michael P. Gilday
Attorney, Agent, or Firm—Burns, Doane, Swecker & Mathis

[57] ABSTRACT

A friction brake assembly for stopping the transmission of motion between drive and driven shafts comprising a brake drum, a coiled braking spring having several turns adapted to frictionally contact the inner peripheral surface of the brake drum to exert a braking force, an operating member rigidly mounted on the drive shaft within the brake drum, a hanger member rigidly mounted on the driven shaft within the brake drum, and a pair of guide members for controlling the braking spring according to the rotation of the drive shaft to allow the braking spring to be released from the condition in which it exerts the braking force.

8 Claims, 18 Drawing Figures

FRICTION BRAKE ASSEMBLY

BACKGROUND OF THE INVENTION

This invention relates to a friction brake assembly.

An adjustable lifting device employed in an automotive vehicle such as, for example, a seat-height adjustment, a window-glass lifter, a head-rest lifter or the like, generally employs a friction brake assembly of a design wherein a force exerted by the operation of a manipulatable element such as a control lever can be transmitted to a loaded element such as a seat bottom, a window glass or a head rest for the adjustment of the position thereof, but force exerted by the loaded element can not be transmitted reversely to the manipulatable element because of a frictional force acting on the loaded element to lock the latter in position.

The friction brake assembly of the type referred to above is disclosed in, for example, the Japanese Laid-open Patent Publication No. 56-124522, published Sept. 30, 1981. The prior art friction brake assembly disclosed in the above-mentioned publication is depicted in FIGS. 1(a) and 1(b) of the accompanying drawings in longitudinal sectional view and in cross-sectional view taken along the indicated lines A—A in FIG. 1(a), respectively.

Figure 1A:
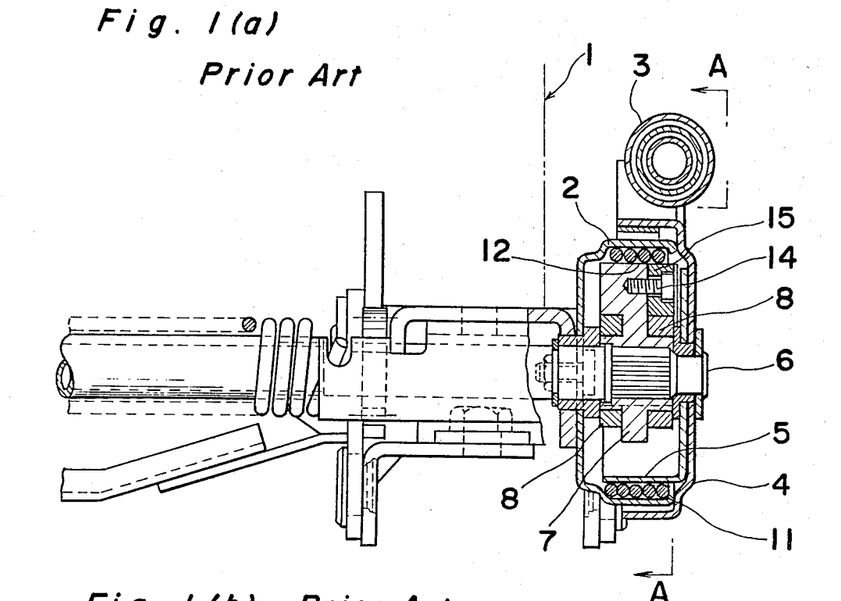
FIG. 1(a) is a longitudinal sectional view of the prior art friction brake assembly.
Figure 1B:
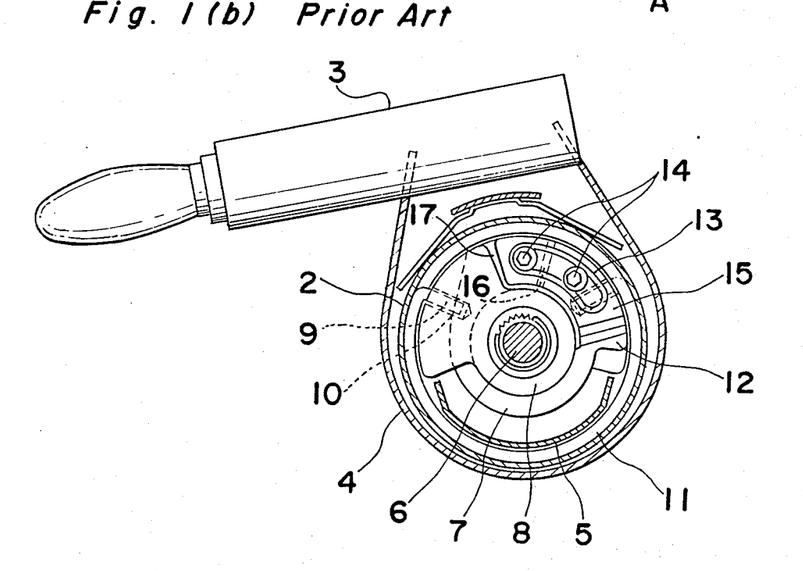
FIG. 1(b) is a cross-sectional view taken along the line A—A in FIG. 1(a)

Referring to FIGS. 1(a) and 1(b), the friction brake assembly is used in association with the seat-height adjustment in an automotive vehicle and comprises a brake drum 2 of a generally cup-like configuration secured to a seat assembly 1, and a cap member 4 mounted on the brake drum 2 for rotation relative thereto and having a hand-operated control lever 3 rigidly connected thereto for rotation together therewith. The brake drum 2 accommodates therein a connecting member 5 fixed to the cap member 4, a relay member 7 fixedly mounted on an adjustment axle 6 forming a part of the seat-height adjustment for the seat assembly 1, a pair of spaced engagement members 8 mounted on the relay member 7, a torsion spring 11 preloaded to allow turns of the coil of the spring 11 to tightly contact the inner peripheral surface of the brake drum 2 and having its opposite ends 9 engaged in radial sockets 10 defined in the respective engagement members 8, and a sector-shaped element 15 fitted to a support projection 12 of the relay member 7 by means of set screws 14 loosely extending through an arcuate slot 13 in the sector-shaped element 15.

In this prior art friction brake assembly now under discussion, the support projection 12 has an abutment face 16 defined therein for the engagement with one of the engagement members 8 whereas the sector-shaped element 15 has an abutment face 17 for the engagement with the other of the engagement members 8. In operation, when the hand-operated control lever 3 is turned above the adjustment axle 6, the connecting member 5 fast with the cap member 4 is engaged to the engagement members 8 to angularly move the latter a distance corresponding to a play between the abutment face 16 (or 17 depending on the direction of turn of the control lever 3) and the engagement members 8. After the engagement members 8 have been angularly moved the distance corresponding to the play to contact the abutment face 16 (or 17) with the torsion spring 11 consequently released, the support projection 12 is urged in the same direction as the direction of turn of the control lever 3 to cause the relay member 7 to rotate together with the adjustment axle 6.

The prior art friction brake device of the construction described above has been developed with a view to minimizing a composite play, including the plays required between the engagement members 8 and the associated abutment faces 16 and 17 for facilitating the release of the torsion spring 11 and the play which is required for facilitating the fabrication of the brake device, by the elimination of the last mentioned play. Specifically, this is said to have been accomplished by rendering the sector-shaped element 15 to be adjustably connecting to the support projection 12 by means of the adjustment screws 14 so that the position of the abutment face 17 relative to the associated engagement member 8 can be adjusted. However, as can readily be understood from FIGS. 1(a) and 1(b), the last mentioned play has not been completely eliminated and still remains relatively large and, therefore, the seat assembly is susceptible to a jolting motion of a magnitude corresponding to the size of the play.

SUMMARY OF THE INVENTION

Accordingly, this invention has been developed with a view to substantially eliminating the disadvantages inherent in the prior art friction brake assembly and has for its essential object to provide an improved friction brake assembly effective to avoid any possible jolting motion of the seat assembly and also to permit a smooth adjustment of the height of the seat assembly above a support surface, for example, the floor, for the support of the seat assembly.

According to this invention, a play is provided only for the release of a frictional force exerted by the torsion spring during the height adjustment of the seat assembly. For this purpose and in a preferred embodiment in accordance with this invention, the improved friction brake assembly comprises a brake drum accommodating therein an operating disc rigidly mounted on a drive shaft coupled to a hand-operated control lever, a hanger rigidly mounted on a driven shaft, a braking spring in the form of a torsion spring, and a pair of opposed guide plates normally positioned between the operating disc and the hanger and interiorly of the braking spring and pivotally connected respectively to the opposite ends of the braking spring. Each of the guide plates has defined therein an abutment area which, when and so long as the operating disc is not rotated, abuts the hanger to lock the latter in position, and a cam area engageable with the operating disc during the rotation of the operating disc. In operation, when the operating disc is rotated as a result of the turn of the hand-operated control lever, the operating disc contacts the cam area of one of the guide plates depending on the direction of turn of the control lever causing the one of the guide plates to jolt with its abutment area consequently disengaging from the hanger so that a clearance necessary to release the braking force of the braking spring can be formed between the hanger and the abutment area of the one of the guide plates.

According to this invention, since the guide plates are arranged in contact with and between the operating disc and the hanger within the brake drum with no clearance formed therebetween and since the guide plates are pivotally connected respectively to the opposite ends of the braking spring, no play is provided between the operating disc and the hanger and, therefore, any possible jolting motion of the seat assembly can advantageously be eliminated.

In addition, since at the initial stage of rotation of the operating disc the guide plate is disengaged from the hanger to provide a clearance between the guide plate and the hanger for accomplishing the release of the application of a braking force exerted by the braking spring, the rotation of the operating disc can smoothly be transmitted to the hanger.

BRIEF DESCRIPTION OF THE DRAWINGS

These and other objects and features of this invention will be readily understood by those skilled in the art from the following description of this invention taken in conjunction with preferred embodiments with reference to the accompanying drawings, in which.

DETAILED DESCRIPTION OF THE EMBODIMENTS

Before the description of the preferred embodiments of this invention proceeds, it is to be noted that like parts are designated by like reference numerals throughout the accompanying drawings except for FIGS. 1(a) and 1(b) to which reference has been made for the discussion of the prior art brake assembly. It is also to be noted that, for facilitating a better understanding of this invention, this invention will be described as used in association with a seat-height adjustment although numerous applications, for example, in a window-glass lifter and a headrest adjustment, are possible.

Figures 2, 3:
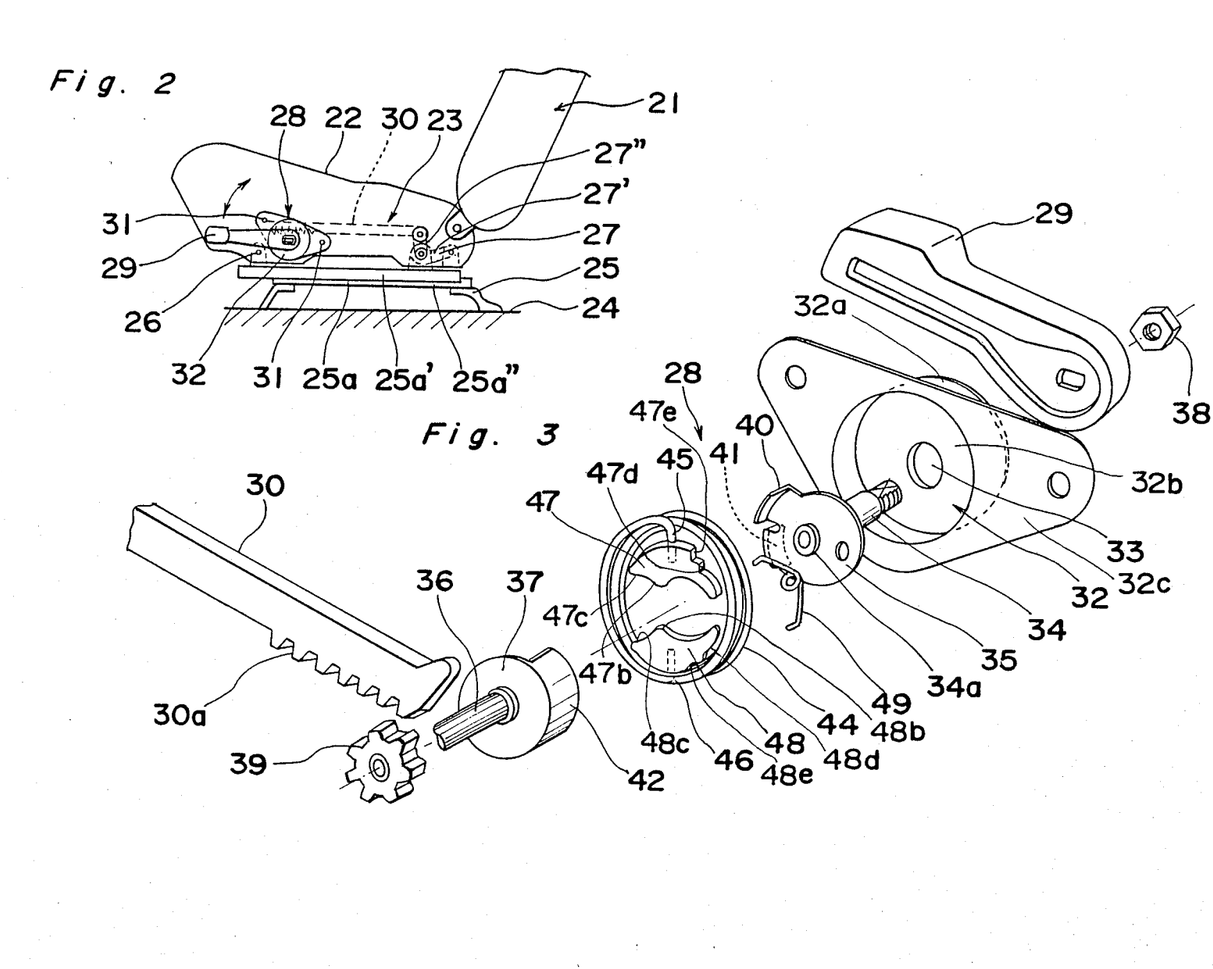
FIG. 2 is a schematic side view of an automobile seat assembly employing a friction brake assembly according to this invention.
FIG. 3 is an exploded view of the brake assembly according to a preferred embodiment of this invention.

Referring to FIG. 2, there is shown an automobile seat assembly 21 comprising a seat bottom 22 mounted on a floor panel 24 within an automobile body structure (not shown) by means of a support structure. The seat support structure comprises a plurality of legs 25 rigidly mounted on the floor panel 24 and an adjustable slide bench 25a including a pair of spaced lower rails 25a" rigidly mounted on the legs 25 and extending in a direction longitudinally of the body structure and a pair of spaced upper rails 25a' slidably mounted on the respective lower rails 25a", the seat assembly 21 being mounted on the upper rails 25a' in a manner as will subsequently be described for the adjustment of the height of the seat bottom 22 above the floor panel 24. In any event, the seat support structure so far described, specifically the adjustable slide mechanism 25a, is well known to those skilled in the art and may, therefore, be of any known construction or may not be essential in the practice of this invention.

The seat bottom 22 is mounted on the upper rails 25a' by means of a seat height adjustment 23 operable to adjust the height of the seat bottom 22, and hence, the seat assembly 21, above the floor panel 24. As shown, while a front lower edge of the seat bottom 22 is hinged at 26 to the upper rails 25a', a rear lower edge of the seat bottom 22, opposite to the hinges 26 with respect to the longitudinal sense of the automobile body structure, is pivotally coupled to the upper rails 25a through hinge arm arrangements 27 each comprised of an arm 27' hinged at its front end to the upper rail 25a' and pivotally connected at its rear end to an arm 27" which is in turn coupled pivotally to a link 30 as will be described later. The seat-height adjustment 23 includes a hand-operated control lever 29 and a friction brake assembly 28 and is so designed and so arranged that, by manipulating the control lever 29, the hinge arm arrangements 27 can be pivoted through the link 30 to elevate or lower the rear portion of the seat bottom 22 thereby effecting the seat height adjustment.

Hereinafter, the details of the friction brake assembly 28 according to this invention will be described with particular reference to FIGS. 3 to 12.

Referring first to FIGS. 3 to 6 showing a first preferred embodiment of this invention, the brake assembly 28 comprises a brake drum 32 having a peripheral wall 32a, an end wall 32b with a bearing hole 33 defined therein, and a flange 32c, said brake drum 32 being secured rigidly to one lateral side of the seat bottom by means of a plurality of set screws or bolts 31 extending through the flange 32c. The brake drum 32 accommodates therein an operating disc 35, which is rigidly mounted on a drive shaft 34 extending rotatably through and supported by the bearing hole 33, and a hanger 37 splined on a driven shaft 36 for rotation together therewith, said driven shaft 36 being axially aligned with the drive shaft 34.

Figures 4, 5A, 5B, 6:
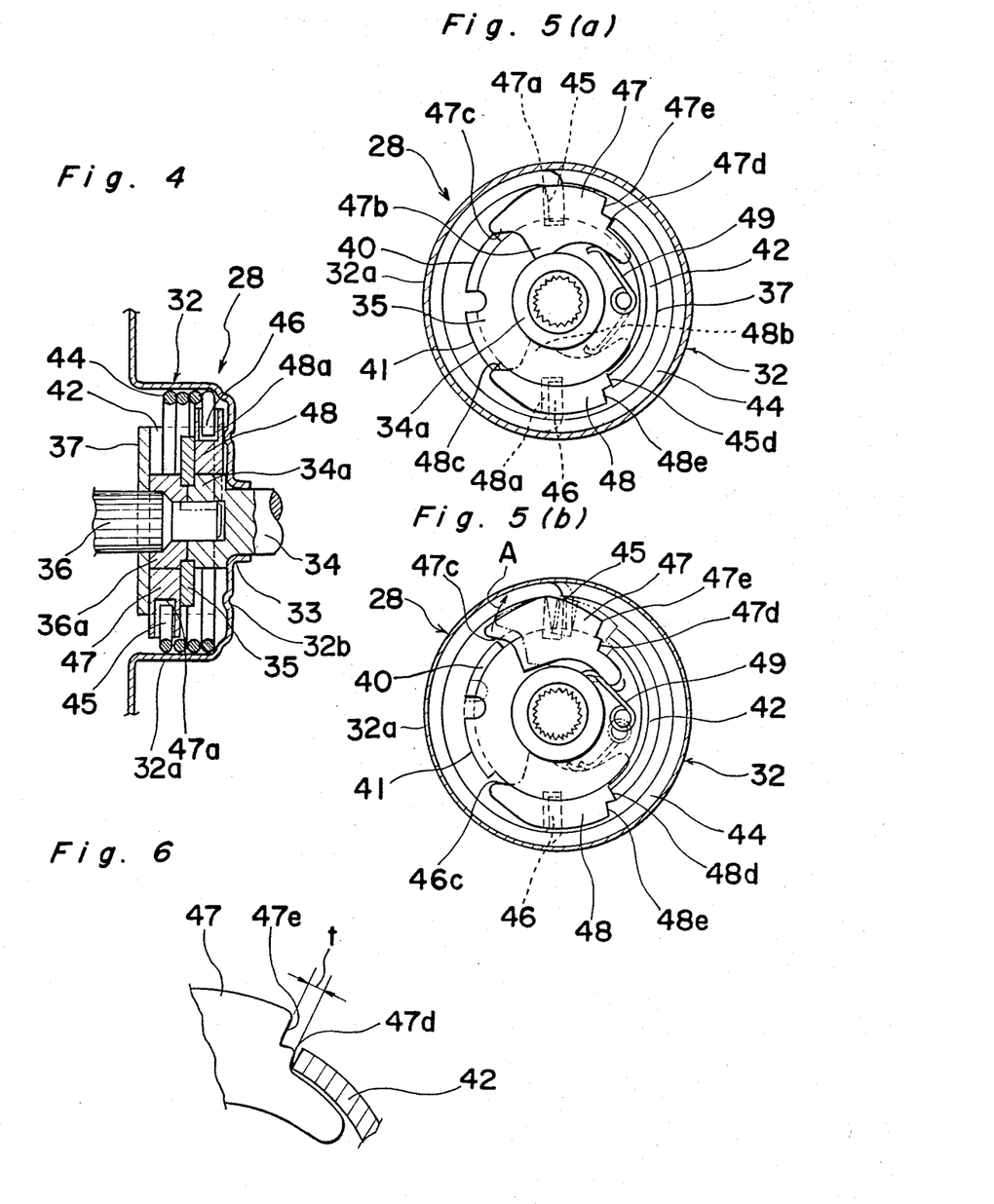
FIG. 4 is a longitudinal sectional view of the brake assembly shown in FIG. 3 in an assembled condition.
FIG. 5(a) and 5(b) are cross-sectional views of the brake assembly with guide plates shown in different operative positions, respectively.
FIG. 6 is a fragmental view, on an enlarged scale, showing the relationship between one of the guide plates and a hanger.

An outer end of the drive shaft 34 on one side of the brake drum 32 opposite to the operating disc 35 is threaded and has the control lever 29 mounted thereon for rotation together therewith and secured thereto by means of a fastening nut 38 threaded to the outer end of the drive shaft 34. On the other hand, one end of the driven shaft 36 remote to the hanger 37 has a pinion gear 39 rigidly mounted thereon for rotation together therewith. The pinion gear 39 is in turn meshed with a rack gear portion 30a defined at one end of the link 30 for translating a rotary motion of the driven shaft 36 into a linear motion performed by the link 30.

As best shown in FIG. 3, the operating disc 35 has a pair of arcuate pawls 40 and 41 formed integrally therewith and extending from a portion of the outer periphery of the disc 35 in the opposite directions, respectively, with respect to each other and in a direction transversely of the disc 35, said pawl 40 facing towards the hanger 37 and said pawl 41 facing towards the end plate 32 of the brake drum 32. On the other hand, the hanger 37 generally in the form of a disc has an arcuate pawl 42 formed integrally therewith and extending from a portion of the outer periphery of the hanger 37 in a direction transversely of the hanger 37 and toward the operating disc 35. It is to be noted that the position of that portion of the outer periphery of the hanger 37 where the arcuate pawl 42 is formed is so selected relative to that of the operating disc 35 where the arcuate pawls 40 and 41 are formed that, in an assembled condition of the brake assembly 28 as shown in FIGS. 4 and 5, the arcuate pawl 42 on the hanger 37 can occupy a position opposite to, and spaced generally 180° from, the arcuate pawls 40 and 41 on the operating disc 35 with respect to the longitudinal axis common to both of the shafts 34 and 36.

The brake drum 32 also accommodates therein a coiled braking spring 44, which may be a torsion spring, held in position within the brake drum 32 exteriorly of the pawls 40, 41 and 42 with its outer periphery tightly contacting the inner peripheral surface of the peripheral wall 32a. The opposite ends 45 and 46 of the spring 44 are bent from the coil of the spring 44 so as to extend radially inwardly in a direction confronting with each other and are loosely received in bearing sockets 47a and 48a, respectively, defined in corresponding guide plates 47 and 48. It is to be noted that, in the assembled condition and so long as the control lever 29 is not manipulated, the opposite ends 45 and 46 of the spring 44 are spaced substantially 180° from each other about the longitudinal axis common to the shafts 34 and 36 and occupy individual positions between the pawl 40 and the pawl 42 and between the pawl 41 and the pawl 42, respectively, as can be seen from FIG. 5.

The guide plates 47 and 48 having the bearing sockets 47a and 48a defined therein so as to extend in a direction perpendicular to the direction of thickness thereof are of identical shape and structure and generally represent an arcuate shape following the contour of the imaginary circle depicted by the arcuate pawls 40 to 42 about the longitudinal axis common to the shafts 34 and 36. While the details of each of the guide plates 47 and 48 will subsequently be described, these guide plates 47 and 48 with the bearing sockets 47a and 48a loosely receiving therein the respective ends 45 and 46 of the spring 44 are so positioned and so arranged as to completely fill up an angular space between the pawl 40 and the pawl 42, respectively, with no clearance formed at any location between the guide plate 47 and any one of the pawls 40 and 42 and between the guide plate 48 and any one of the pawls 41 and 42.

As hereinbefore described, the guide plates 47 and 48 are of identical shape and structure and the details thereof will now be described in connection with only one of them, for example, the guide plate 47. As best shown in FIGS. 3 and 5, the guide plate 47 has a portion generally opposite to the bearing socket 47a protruding radially inwardly of the braking spring 44 to define a point of pivot 47b contacting a boss 36a which is rigidly mounted on the driven shaft 36 and located on one side of the hanger opposite to the pinion gear 39 as best shown in FIG. 4. One end of the guide plate 47 confronting the pawl 40 has a cam face 47c defined thereat for engagement with the pawl 40. In addition, a portion of the guide plate 47 adjacent the other end thereof confronting the pawl 42 is, as best shown in FIG. 6, stepped to define first and second abutment faces 47d and 47e for engagement with the pawl 42 on the hanger 37, said second abutment face 47e being spaced a distance, as shown by t in FIG. 6, from the first abutment face 47d in a direction away from the pawl 42.

With respect to the guide plate 48, it has defined therein a point of pivot 48b, a cam face 48c and first and second abutment faces 48d and 48e which functionally corresponds to the pivot point 47b, the cam face 47c and the first and second abutment faces 47d and 47e of the guide plate 47, respectively. However, it should be noted that the pivot point 48b of the guide plate 48 rests on a boss 34a rigidly mounted on the drive shaft 34 and located on one side of the operating disc 35 opposite to the end plate 32b and that, in view of the symmetrical arrangement of the guide plates 47 and 48 with respect to the imaginary line passing at right angles to the longitudinal axis common to the shafts 34 and 36, the cam face 48c of the guide plate 48 is engageable with the pawl 41, not the pawl 40 with which the cam face 47c of the guide plate 47 engages.

The guide plates 47 and 48 are so designed and so positioned that, when the control lever 29 is turned in one direction, for example, clockwise as viewed in FIG. 5, about the common longitudinal axis accompanied by a corresponding rotation of the shaft 34 and, hence, the operating disc 35, the pawl 40 on the operating disc 35 can slide the cam face 47c from below, as seen in FIG. 5, causing the guide plate 47 to jolt about the pivot point 47b to let the pawl 42, which has been engaged to the abutment face 47d as shown in FIG. 5(b) under the influence of a circumferentially acting force of the spring 44, to skip onto the abutment face 47e as shown in FIG. 5(b). On the other hand, when the control lever is turned in the opposite direction, the guide plate 48 plays a similar role to that performed by the guide plate 47 during the turn of the control lever 29 in said one direction as hereinabove described. The set-back distance t between the first and second abutment faces 47d and 47e (or 48d and 48e) in each of the guide plates 47 or 48 is the distance required for the spring 44 to release a frictional force exerted between the outer periphery of the spring 44 and the inner peripheral surface of the wall 32a.

In order to ensure that, when and so long as the control lever 29 has not yet been turned, the respective guide plates 47 and 48 are held in position with the abutment faces 47d and 48d engaged with the pawls 42, a wire spring 49 is housed within the brake drum 32 and positioned between the respective ends of the guide plates 47 and 48 confronting the pawl 42 so as to apply a biasing force to the guide plates 47 and 48 thereby causing said respective ends of the guide plates 47 and 48 to separate away from each other.

The friction brake assembly 28 of the above described construction operates in the following manner.

Assuming that the control lever 29 has not yet been turned, and assuming that an automobile driver sits on the seat bottom 22 applying his weight to the driven shaft 36 through the link 30 so as to rotate the hanger 37 in a direction; for example, counterclockwise as viewed in FIG. 5(a) the pawl 42 on the hanger 37 tends to urge the guide plate 47 so as to move it in a counterclockwise direction about the common longitudinal axis. However, since the coiled braking spring 44 has been preloaded so as to expand radially outwardly, i.e., increase the outer diameter thereof, with its outer periphery tightly contacting the inner peripheral surface of the wall 32a of the brake drum 32, no counterclockwise movement of the guide plate 47 takes place and, thus, the hanger 37 does not rotate, effecting a braking action to the seat-height adjustment 23.

A similar effect takes place with respect to the guide plate 48 when an external pull is applied to the seat bottom 22 to lift the latter with the hanger 37 consequently tending to rotate in the opposite, clockwise direction.

During the condition as hereinbefore described, since no clearance is created between the guide plate 47 and any one of the pawls 40 and 42 and between the guide plate 48 and any one of the pawls 41 and 42, neither the drive shaft 34 nor the driven shaft 36 play idle and, therefore, the seat bottom 22 can steadily be retained at a preselected height above the floor panel 24 with no possibility of being jolted.

Where the driver desires to lift the seat assembly 21 to, for example, a higher position in such a way as to elevate the rear of the seat bottom 22, the control lever 29 is turned a distance in a direction, for example, clockwise, by applying a pull thereto to rotate the drive shaft 34 in a clockwise direction as viewed in FIG. 5(a). As the drive shaft 34 is so rotated accompanied by a corresponding clockwise rotation of the operating disc 35, the pawl 40 on the disc 35 slides the cam face 47c of the guide plate 47 from below urging the latter to loosely pivot clockwise relative to the spring end 45 against the biasing force of the wire spring 49 as shown in FIG. 5(b), resulting in that the pawl 42 on the hanger 37 is disengaged from the abutment face 47d, skipping onto the abutment face 47e. As the pawl 42 skips onto the abutment face 47e, moving an angular distance corresponding the set-back distance t, the coiled braking spring 44 is released from the preloaded condition, radially inwardly contracting with its outer periphery consequently reduced, and accordingly, the frictional force which has been developed between the coiled braking spring 44 and the peripheral wall 32a is reduced.

When and after the frictional force has been reduced in this way, the coiled braking spring 44 is free to rotate together with the operating disc 35 and also with the hanger 37 with the pawl 42 drivingly coupled to the pawl 40 through the guide plate 47. Therefore, the further clockwise rotation of the drive shaft by the continued pull of the control lever 29 is accompanied by a corresponding rotation of the driven shaft 36 and, consequently, the link 30 is axially linearly moved to elevate the rear of the seat bottom 22.

After the seat height adjustment, and immediately after the subsequent release of the pull from the control lever 29, the coiled braking spring 44 expands radially outwardly to resume the preloaded condition with the cam face 47 pushing the pawl 40 so as to rotate the operating disc in the counterclockwise direction while loosely pivoting counterclockwise relative to the spring end 45. Therefore, the operating disc 35 is rotated a distance counterclockwise about the common longitudinal axis to allow the guide plate 47 to loosely pivot under the influence of the biasing force of the wire spring 49. The consequence is that the pawl 42 which has been engaged to the abutment face 47e is brought into engagement with the abutment face 47d, with all of the movable elements returning to the original positions as shown in FIG. 5(a).

It is to be noted that the guide plate 48 and the associated pawl 41 function in a similar manner to the guide plate 47 and the pawl 40 when the control lever 29 is turned in the opposite, counterclockwise direction by the application of a push thereto in an attempt to adjust the seat assembly 21 to a lower position.

In the foregoing embodiment, it has been described and shown that the rotation of the operating disc 35 is transmitted to the hanger 37 through the guide plates 47 and 48 during the turn of the control lever 29. However, it is possible to couple the operating disc 35 direct to the pawl 42 and, hence, the hanger 37 when the rotation of the disc 35 is to be transmitted to the hanger 37, and this will now be described in connection with a second preferred embodiment with reference to FIGS. 7(a) and 7(b).

Figures 7A, 7B, 9:
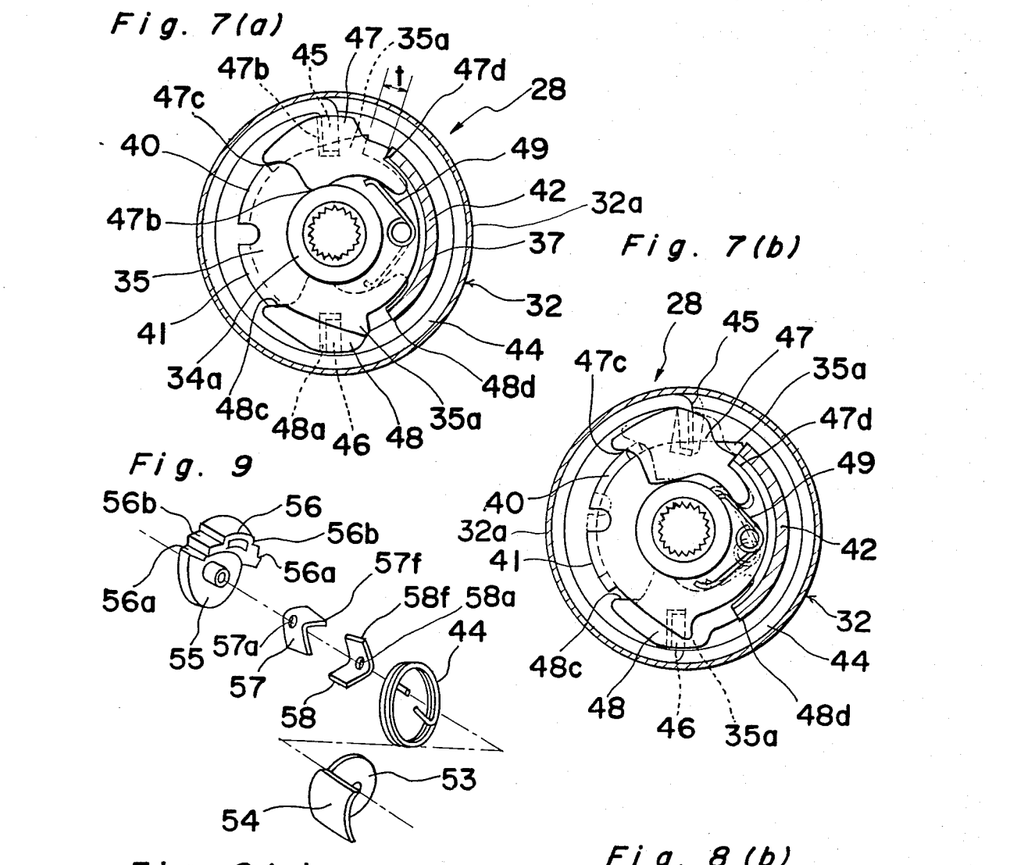
FIGS. 7(a) and 7(b) are views similar to FIGS. 5(a) and 5(b), respectively, showing the brake assembly according to another preferred embodiment of this invention.
FIG. 9 is an exploded view showing a portion of the brake assembly of FIGS. 8(a) and 8(b)

Referring now to FIGS. 7(a) and 7(b), each of the guide plates 47 and 48 has only the abutment face 47d or 48d and, instead, a portion of the outer peripheral edge of the operating disc 35 which correspond in position to the abutment face 47e or 48e employed in the foregoing embodiment is formed with a corresponding radially outwardly protruding abutment 35a. These abutments 35a and 35b on the operating disc 35 correspond functionally to the abutment faces 47e and 48e employed in the foregoing embodiment, respectively, and are engageable with the pawl 42 one at a time depending on the direction of turn of the control lever 29 for the direct transmission of the rotation of the operating disc 35 to the hanger 37.

The friction brake assembly according to the second preferred embodiment functions in a manner substantially similar to that according to the foregoing embodiment. Specifically, when the control lever 29 is pulled to rotate the operating disc 35 in the clockwise direction, the guide plate 47 is loosely pivoted from a position shown in FIG. 7(a) to a position shown by the solid line in FIG. 7(b) in a manner similar to that in the foregoing embodiment with the abutment face 47d consequently disengaging from the pawl 42. The actual disengagement of the abutment face 47d from the pawl 42 takes place substantially simultaneously with the angular movement of the radially outwardly protruding abutment 35a on the operating disc 35, being then rotated together with the control lever 29, through an angular distance corresponding to the set-back distance t, at which time the pawl 32 having disengaged from the abutment face 47d is engaged to the abutment 35a thereby to establish the direct transmission of motion from the operating disc 35 to the hanger 37. Thereafter, the seat height adjustment can be effected in a manner as described in connected with the foregoing embodiment.

After the seat-height adjustment, and immediately after the subsequent release of the pull from the control lever 29, the guide plate 47 restores to the original position as shown in FIG. 7(a) by the action of the wire spring 49 in a manner as hereinbefore described in connection with the foregoing embodiment with the pawl 42 consequently engaged to the abutment face 47d having disengaged from the abutment 35a on the operating disc 35.

The guide plate 48 and the radially outwardly protruding abutment opposite abutment 35a play a role substantially similar to the guide plate 47 and the abutment 35a when the control lever 29 is pushed to rotate the operating disc in the opposite, counterclockwise direction.

In the first preferred embodiment shown in FIGS. 3 to 6, the guide plates 47 and 48 have been shown and described as having the abutment faces 47d and 47e and the abutment faces 48d and 48e, respectively. However, they may be formed on the hanger, examples of which will be described with reference to FIGS. 8 to 12.

Figure 8A:
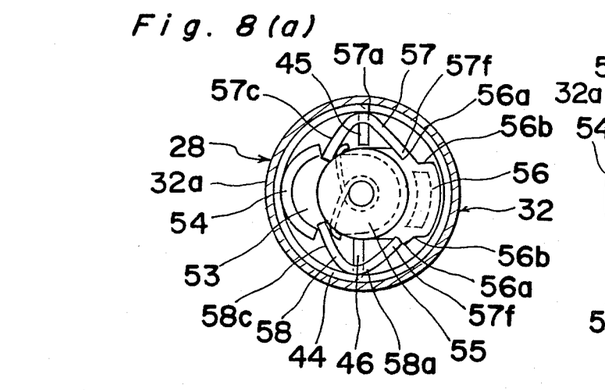
FIGS. 8(a) and 8(b) are views similar to FIGS. 5(a) and 5(b), respectively, showing a further preferred embodiment of this invention.
Figure 8B:
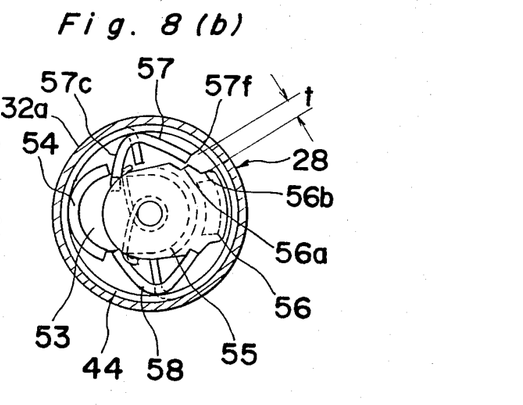

Referring first to FIGS. 8 and 9 showing a third preferred embodiment of this invention, an operating disc 53 has a portion of the outer periphery formed integrally with an arcuate pawl 54 extending therefrom in a direction perpendicular thereto, and a hanger 55 in the form of a disc has a portion of the outer periphery formed integrally with a generally arcuate block 56 protruding therefrom in a direction perpendicular to the hanger 55 and extending generally arcuately along that portion of the outer periphery of the hanger 55. In an assembled condition and within the brake drum 32, the pawl 54 on the operating disc 53 and the arcuate block 56 on the hanger 55 are angularly spaced 180° from each other about the common longitudinal axis. Respective angular spaces between the opposite sides of the pawl 54 and that of the arcuate block 56 are filled up by associated guide plates 57 and 58, each of said guide plates being made from an elongated metal strip bent so as to assume a generally V-shaped configuration. These guide plates 57 and 58 have respective bearing holes 57a and 58a defined at the bent points thereof for loosely receiving the associated ends 45 and 46 of the coiled braking spring 44 therethrough. An exterior surface of one end portion of each of the guide plates 57 and 58 confronting the pawl 54 on the operating disc 53 serves as a cam face as shown by 57c or 58c, respectively.

As best shown in FIG. 9, the opposite ends of the arcuate block 56 spaced generally circumferentially of the hanger 55 are each stepped to define respective pairs of first and second abutment faces 56a and 56b, one pair thereof being engageable with one end 57f of the guide plate 57 while the other pair thereof are engageable with one end 58f of the guide plate 58. As is the case with the first and second abutment faces in the respective guide plates 47 and 48 in the first embodiment of this invention, each pair of the abutment faces 56a and 56b are spaced a set-back distance t as shown in FIG. 8(b).

As best shown in FIG. 8(a), in the assembled condition of the friction brake assembly according to the third preferred embodiment and so long as the control lever has not yet been turned, the opposite side edges of the pawl 54 on the operating disc 53 are held in contact with the respective cam faces 57c and 58c of the guide plates 57 and 58 with no clearance formed therebetween while the respective ends 57f and 58f of the guide plates 57 and 58 are simultaneously engaged to the associated first abutment faces 56a on both ends of the arcuate block 56 with no clearance formed therebetween. However, depending on the direction of movement of the guide plates 57 and 58 relative to the spring ends 45 and 46, the end 57f or 58f of one of the guide plates 57 and 58 may skip onto the associated abutment face 56b, thereby allowing the frictional force, i.e., the braking force, to be released.

In operation, assuming that a force tending to rotate the hanger 55 in a direction, for example, clockwise as viewed in FIGS. 8(a) and 8(b), is applied to the driven shaft 36 fast with the hanger 55, the guide plate 57 tends to be pivoted relative to the spring end 45 in a direction clockwise since the end 57f thereof is engaged to the abutment face 56a. However, since the braking spring 44 is in the preloaded condition with its turns expanded radially outwardly contacting the inner peripheral surface of the peripheral wall 32a of the brake drum 32 thereby to effect the braking, the hanger 55 does not rotate and, consequently, the guide plate 57 does not substantially undergo any motion. Therefore, as is the case with any one of the foregoing embodiments, the seat assembly 31 can be steadily held at an adjusted height with no possibility of being jolted.

Where the seat-height adjustment is desired to be effected, and when the control lever 29 is, for example, pulled to rotate the drive shaft 34 in a counterclockwise direction as viewed in FIGS. 8(a) and 8(b), one of the side edges of the pawl 54 integral with the operating disc 53 adjacent the guide plate 57 slides the cam face 57c of the guide plate 57 while pushing it to pivot relative to the spring end 45 from a position shown in FIG. 8(a) to a position shown in FIG. 8(b) with the end 57f thereof consequently disengaged from the abutment face 56a and then engaged to the abutment face 56b. Upon the engagement of the end 57f of the guide plate 57 to the abutment face 56b effected in the manner as hereinabove described, the braking spring 44 is radially inwardly contracted having been released from the preloaded condition to an extent as determined by the set-back distance t over which the guide plate 57 is moved by the action of the braking spring 44. Thus, in this condition, the braking force applied by the brake assembly is released and the seat-height adjustment, i.e., the elevation of the rear of the seat bottom 22, can be effected at the will of the automobile driver. This is because, after the end 57f of the guide plate 57 has been engaged to the abutment face 56b, the further rotation of the operating disc 53 rigid on the drive shaft 34 as a result of the continued pull of the control lever 29 can be transmitted to the hanger 55 through the guide plate 57 and, hence, to the driven shaft 36.

After the seat-height adjustment, and when the external pull applied to the control lever 29 is released therefrom, the guide plate 57 pushes the pawl 54 to rotate the operating disc 53 is the counterclockwise direction under the influence of the spring force exerted by the braking spring 44 being then expanded radially outwardly to apply the friction force, while the guide plate 57 is pivoted by the wire spring 49 to allow the end 57f to be engaged with the abutment face 56a thereby restoring the initial position as shown in FIG. 8(a).

Where the control lever 29 is pushed at the start of the seat-height adjustment, the guide plate 58 plays a role in a manner similar to the guide plate 57 as hereinbefore described.

While the third embodiment of this invention shown in and described with reference to FIGS. 8 and 9 is similar to the first embodiment of FIGS. 3 to 6 in that the guide plates are intervened in the transmission of motion between the drive shaft 34 and the driven shaft 36, the following fourth preferred embodiment of this invention is similar to the second embodiment described with reference to and shown in FIG. 7 in that the rotation of the drive shaft 34 can be transmitted direct to the driven shaft 36 when and so long as the braking is released.

Figure 10A:
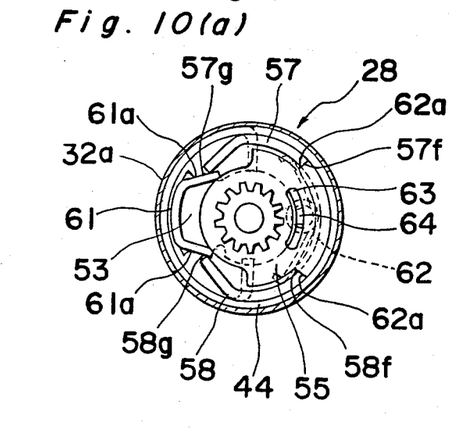
FIGS. 10(a) and 10(b) are views similar to FIGS. 5(a) and 5(b), respectively, showing a still further preferred embodiment of this invention.
Figure 10B:
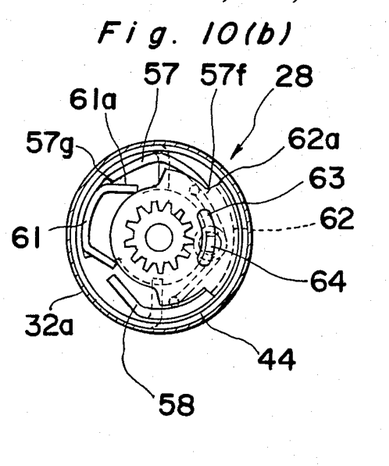
Figure 11:
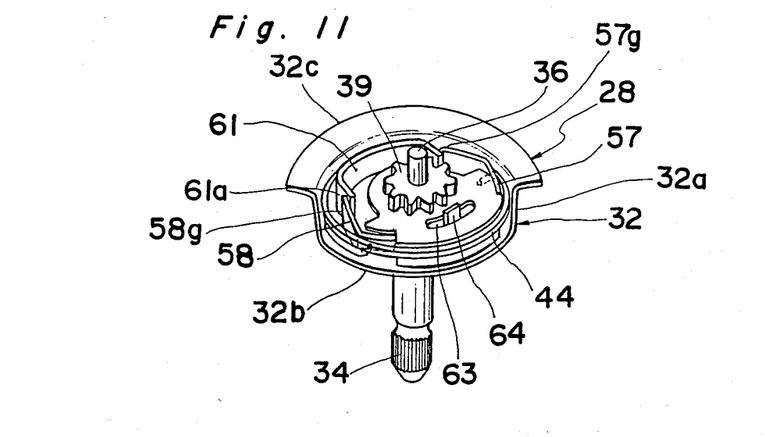
FIG. 11 is a perspective view, with a portion broken away, showing an interior mechanism of the brake assembly shown in FIGS. 10(a) and 10(b)
Figure 12A:
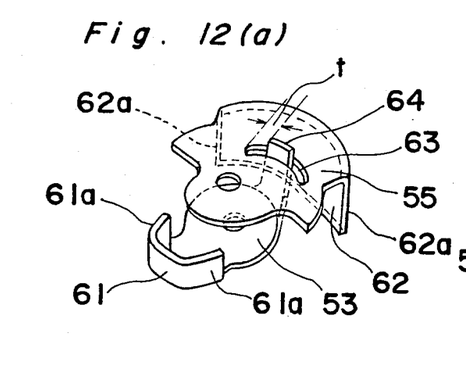
FIG. 12(a) is a perspective view of a portion of the brake assembly of FIGS. 10(a) and 10(b), showing the relationship between an operating disc and the hanger.
Figure 12B:
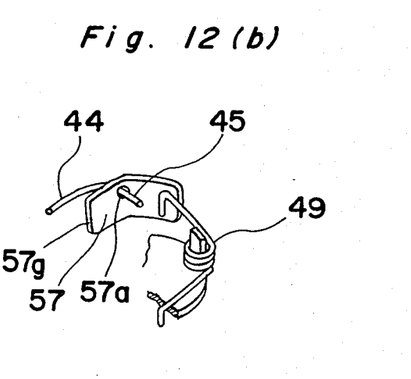
FIG. 12(b) is a perspective view of another portion of the brake assembly of FIGS. 10(a) and 10(b), showing the relationship between one of the guide plates and a biasing spring.

Referring now to FIGS. 10 to 12 showing the fourth preferred embodiment of this invention, the operating disc 53 is integrally formed with an elongated pawl 64 protruding from the outer periphery thereof in a direction perpendicular thereto towards the hanger 55, and also with a generally U-shaped pawl 61 protruding from the outer periphery thereof in the same direction as the elongated pawl 64 and located a position opposite to the elongated pawl 64. The opposite end portions of the generally U-shaped pawl 61, spaced from each other in a direction generally circumferentially of the operating disc 53, has respective cam faces defined at 61a for engagement with respective ends 57g and 58g of the associated guide plates 57 and 58 adjacent the pawl 61. On the other hand, the hanger 55 is also integrally formed with an arcuate pawl 62 protruding outwardly from the outer periphery thereof in a direction towards the operating disc 53 and extending arcuately with respect to the axis of rotation thereof. The opposite ends of the pawl 62, spaced from each other in a direction generally circumferentially of the hanger 55, are formed as respective abutment ends 62a slidingly engageable with the respective ends 57f and 58f of the associated guide plates 57 and 58.

As best shown in FIGS. 11 and 12(a), the elongated pawl 64 integral with the operating disc 53 loosely extends through an arcuate slot 63 defined in the hanger 55, the arcuate slot 63 in the hanger 55 being so sized as to enable the elongated pawl 64 to move an angular distance, shown by t in FIG. 12(a), in both directions from an intermediate position towards the opposite ends of said slot 63. This angular distance t on respective sides of the elongated pawl 64 within the slot 63 corresponds to the set-back distance hereinbefore described in connection with any one of the foregoing embodiments and is required to release the braking spring 44 from the preloaded condition to release the braking force.

The friction brake assembly described with reference to and shown in FIGS. 10 to 12 operates in the following manner. Assuming that the control lever 29 is pulled to rotate the drive shaft 34 and, hence, the operating disc 53 in the clockwise direction, one of the cam faces 61a of the arcuate pawl 61 adjacent the guide plate 57 pushes the end 57g of the guide plate 57 to pivot the latter relative to the spring end 45 in the clockwise direction from a position shown in FIG. 10(a) to a position shown in FIG. 10(b) with the opposite end 57f of the same guide plate 57 consequently disengaged from one of the abutment ends 62a of the arcuate pawl 62 adjacent the guide plate 57.

As the operatifg disc 53 is continuously rotated with the elongated pawl 64 on the disc 53 moving the distance t in one direction within the slot 63 in the hanger 55 while the guide plate 57 is further pushed by the U-shaped pawl 61 on the operating disc 53, the braking spring 44 is radially inwardly contracted with its turns substantially disengaged from the inner peripheral surface of the wall 32a of the brake drum 32 thereby releasing the braking force.

After the elongated pawl 64 has moved the distance t and consequently contacted one of the opposite ends of the slot 63 with respect to the direction of rotation of the operating disc 53, the direct transmission path is established between the drive shaft and the driven shaft via the operating disc 53 and then the hanger 55 and, accordingly, the movement of the control lever 29 for the height adjustment, i.e., to lift the rear of the seat bottom 22; can be transmitted to the link 30.

In the event that and after the external pull applied to the control lever 29 has been released therefrom, the guide plate 57 pushes the U-shaped pawl 61 to rotate the operating disc 53 in the counterclockwise direction under the spring force exerted by the braking spring 44 then expanding radially outwardly to effect the braking, and therefore, the end 57f of the guide plate 57 is brought again into engagement with the pawl 62 on the hanger 55 by the biasing force of the associated wire spring 49, with the guide plate 57 consequently returning to the original position as shown in FIG. 10(a).

From the foregoing full description of this invention, it has become clear that since any one of the movable component parts does not substantially undergo any idle play within the brake drum, the friction brake assembly of this invention is effective to apply the braking force to lock the drive and driven shafts without permitting any relative idle rotation thereof. Therefore, when used with the seat-height adjustment such as hereinbefore described, the friction brake assembly of this invention is effective to allow the seat-height adjustment to be performed smoothly with no substantial possibility of the seat assembly being jolted during such adjustment.

Although this invention has fully been described in connection with the preferred embodiments thereof with reference to the accompanying drawings, it should be noted that various changes and modifications are apparent to those skilled in the art. By way of example, although the friction brake assembly of this invention has been described and shown as applied in the seat-height adjustment, it can equally be applied in the window-glass lifter, the head-rest adjustment or any other environment where the transmission of motion between the drive shaft and the driven shaft is desired to be braked.

Accordingly, such changes and modifications are, unless they depart from the scope of this invention as defined by the appended claims, to be construed as included therein.

We claim:

1. A friction brake assembly which comprises a brake drum accomodating therein an operating member mounted on a drive shaft for rotation together therewith, a hanger member mounted on a driven shaft for rotation together therewith, a coiled braking spring adapted to contact an inner peripheral surface of the brake drum to apply a braking force to stop the transmission of motion between the drive and driven shafts, and a pair of guide members interposed between the operating member and the hanger member and loosely pivotally connected to opposite ends of the braking spring, respectively, each of said guide members having a first abutment normally engageable with the hanger member, when and so long as the operating member is not rotated, to stop the motion of the hanger member, and a cam area engageable with the operating member during the rotation of the operating member, the normal engagement between the respective guide member and the hanger member being released by the pivotal movement of the respective guide member which takes place as a result of engagement between the cam area and the operating member at an initial stage of rotation of the operating member, a clearance necessary to release the braking spring, thereby permitting the operating member and the hanger member to rotate relative to each other, being formed between one of the operating member and the guide member and the hanger member subsequent to the disengagement between the respective guide member and the hanger member.

2. An assembly as claimed in claim 1, wherein the opposite ends of the braking spring are bent radially inwardly so as to confront with each other, each of said guide members having a socket defined therein for loosely and pivotally receiving therein a corresponding one of the opposite ends of the braking spring.

3. An assembly as claimed in claim 2, wherein said clearance is defined between the respective guide member and the hanger member.

4. An assembly as claimed in claim 3, wherein each of the guide members is in the form of a shaped plate having its opposite surface lying perpendicular to the longitudinal axis of the brake drum, and said hanger member is formed with a pawl extending in a direction parallel to the longitudinal axis of the brake drum, said first abutment being engageable with said pawl, and wherein each of said guide members has a second abutment engageable with the pawl of the hanger member when and after the pawl has been disengaged from the first abutment for the release of the braking spring.

5. An assembly as claimed in claim 3, wherein each of the guide members is in the form of an elongated plate bent so as to represent a generally U-shaped configuration, one end of said respective guide members constituting said first abutment, and said hanger member comprises a flat body lying at right angles to the longitudinal axis of the brake drum and a block protruding in a direction parallel to the longitudinal axis of the brake drum, said block having defined therein a first abutment face for engagement with the first abutment of the respective guide member and a second abutment face for engagement with the first abutment of the respective guide member when and after the braking spring has been released.

6. An assembly as claimed in claim 2, wherein said clearance is defined between the operating member and the hanger member.

7. An assembly as claimed in claim 6, wherein each of the guide members is in the form of a shaped plate having its opposite surface lying perpendicular to the longitudinal axis of the brake drum, and said hanger member is formed with a pawl extending in a direction parallel to the longitudinal axis of the brake drum, and wherein said operating member has a stop projection defined therein for engagement of the pawl of the hanger member when and after the braking spring has been disengaged, said first abutment of the respective guide member being engageable with the pawl of the hanger member.

8. An assembly as claimed in claim 6, wherein the hanger member comprises a flat body lying at right angles to the longitudinal axis of the brake drum and a block protruding in a direction parallel to the longitudinal axis of the brake drum, said flat body having an arcuate slot defined therein, and each of the guide members is in the form of an elongated plate bent so as to represent a generally U-shaped configuration, said block having an abutment face defined therein for engagement with one end of the respective guide member, and wherein the operating member has a pawl loosely engaged in the arcuate slot, said pawl of the respective guide member being engaged to one end of the arcuate slot when and after the braking spring has been released.

* * * * *